Sept. 15, 1959 C. E. ATKINS ET AL 2,904,699

AUTOMATIC HEADLIGHT DIMMING SYSTEM

Filed Sept. 22, 1954 2 Sheets-Sheet 1

Inventors
Carl E. Atkins &
Eugene G. Mathis
By R. E. Fowler
Attorney

Sept. 15, 1959 C. E. ATKINS ET AL 2,904,699

AUTOMATIC HEADLIGHT DIMMING SYSTEM

Filed Sept. 22, 1954 2 Sheets-Sheet 2

Inventors
Carl E. Atkins &
Eugene G. Matkins
By R. E. Fowler
Attorney 2,904,699
Patented Sept. 15, 1959

2,904,699

AUTOMATIC HEADLIGHT DIMMING SYSTEM

Carl E. Atkins, Bloomfield, N.J., and Eugene G. Matkins, Reelsville, Ind., assignors to General Motors Corporation, Detroit, Mich., a corporation of Delaware Application September 22, 1954, Serial No. 457,716

5 Claims. (Cl. 250—214)

This invention relates to light controlled switching systems and more particularly to light actuated switching means for controlling the energization of multi-beam headlamps of automotive vehicles.

Although light actuated automatic headlamp dimming means are currently offered as an accessory on automotive vehicles, these require relatively high voltage for some of the component parts and, therefore, include auxiliary power supply means such as are conventionally known as power packs.

It is an object in making this invention to provide a control system for the automatic dimming of automotive headlamps which includes components that do not require voltages higher than that available on the vehicle.

It is a further object in making this invention to provide a light actuated headlamp control system for automotive vehicles which operates from the vehicle supply voltage.

It is a still further object in making this invention to provide a low voltage light controlled system for automatically switching multifilament headlamps of an automotive vehicle.

It is a still further object in making this invention to provide automatic switching means controlled by an oscillator which is cut off or energized by a predetermined amount of incident light on a photosensitive unit.

Figure 1:
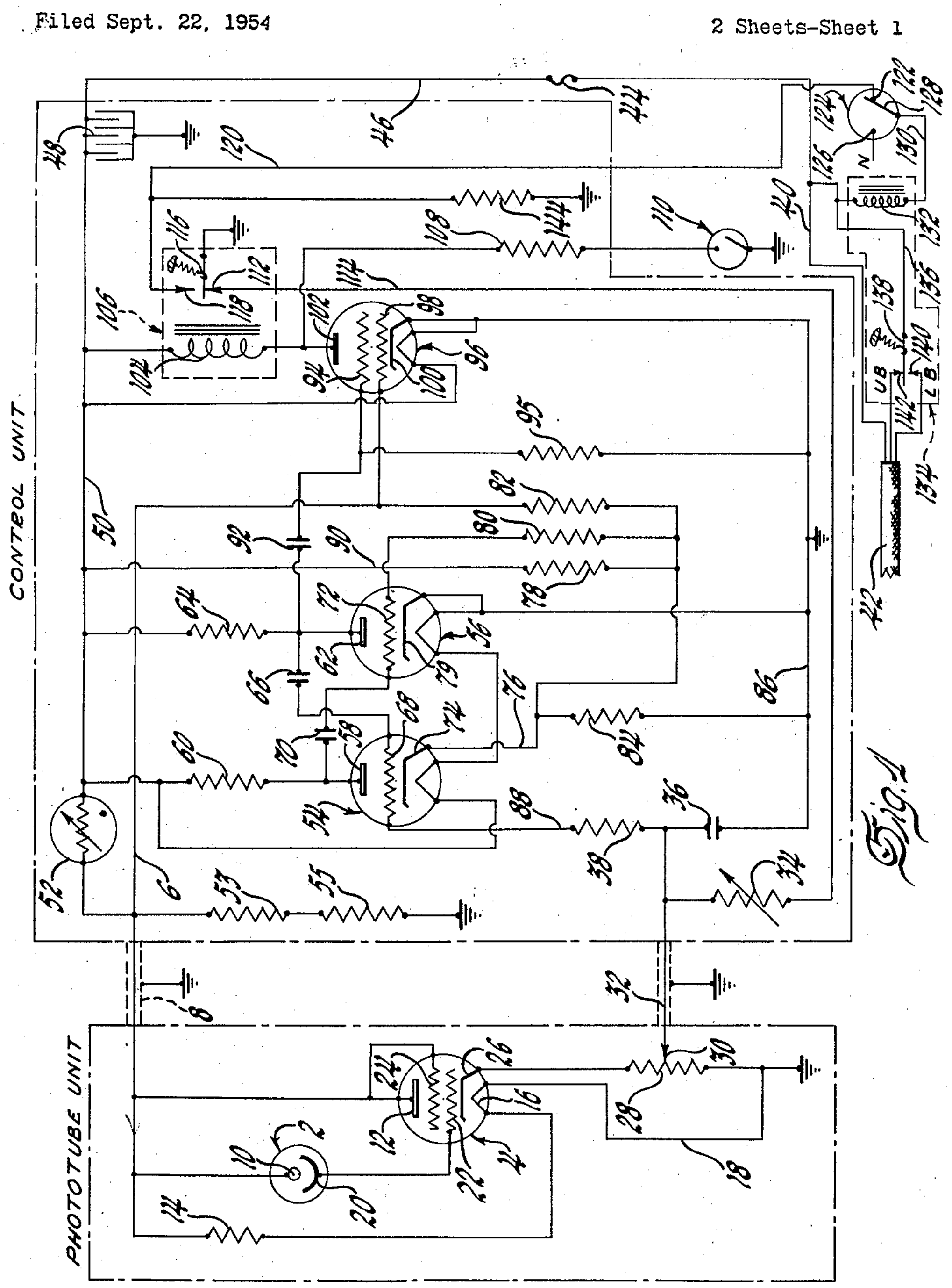
Figure 2:
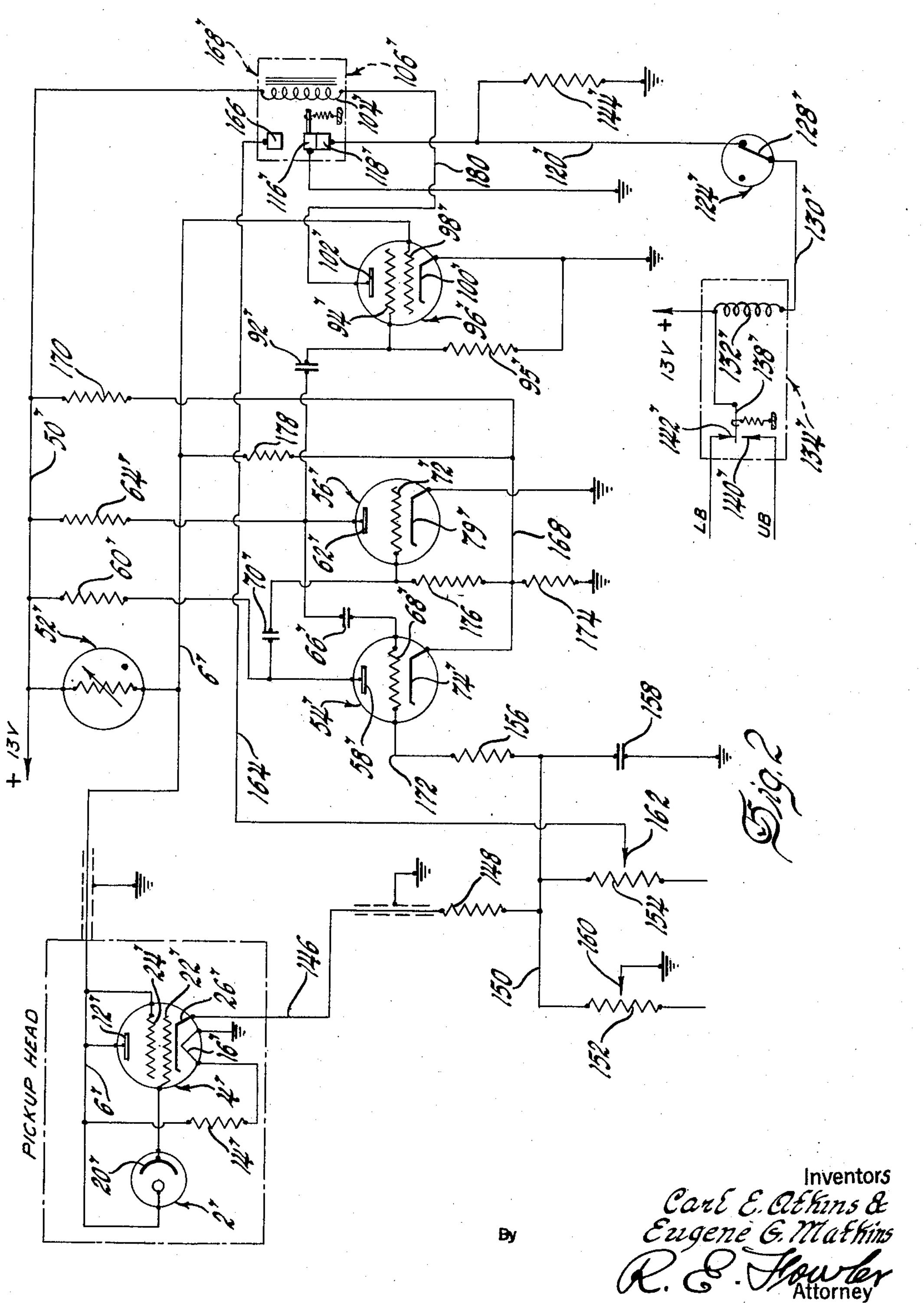

With these and other objects in view which will become apparent as the specification proceeds, our invention will be best understood by reference to the following specification and claims and the illustrations in the accompanying drawings, in which:

Figure 1 is a circuit diagram of a light actuated circuit embodying our invention for automatic headlamp dimming; and Figure 2 is a circuit diagram illustrating a modified form of our invention.

These systems incorporate in general a power amplifier stage which controls the switching means, the conductivity through which is varied by the output of an oscillator connected thereto. The oscillator is turned on and off so that it will oscillate or become non-oscillatory by a light sensitive unit. When no light falls on the light sensitive means, the oscillator is in the non-oscillatory state, and the power amplifier stage is so biased that it conducts a sufficient amount of current to energize a control relay coil and maintain the headlamps on high beam. When light falls on the photocell, the output of an amplifier is varied and at a predetermined light level the oscillator goes into oscillation to produce a series of pulses. The amplitude of these pulses remains substantially constant through the operating range of the oscillator, but as the input or control voltage rises, the frequency of the oscillator increases.

While various types of oscillatory circuits may be employed within the scope of our invention, we have illustrated herein the use of the multivibrator type. The output of the oscillator controls the flow of current through the power amplifier, reducing the flow to cause the relay coil to drop its armature and switch the system to low beam energization when the oscillator is in operation.

With this general description in mind, reference will now be made specifically to Figure 1. The system consists essentially of two units, one shown in dash and dotted outline on the left-hand side of the figure and labeled "phototube unit," and the second shown in a larger dash and dotted outline to the right and labeled "control unit." The phototube unit is designed to be mounted at some convenient location such as behind the windshield of an automotive vehicle so that oncoming light rays may fall thereon and actuate the system. The control unit on the other hand includes an oscillator and power amplifier stage as well as a sensitive relay switching means. This unit can be mounted either under the instrument panel or possibly in the engine compartment if necessary. The phototube unit consists of a light sensitive cell 2 and an initial D.C. amplifier stage which includes the multi-element electron tube 4. A regulated power supply line 6 extends from the control unit through a shielded cable 8 to the phototube unit and is connected directly to the anode 10 of the phototube, and to the plate 12 of the amplifier tube. Line 6 is also connected through a dropping resistor 14 to one side of the heating filament 16 of the tube 4, the opposite side of which is connected through conductor 18 to ground.

The cathode 20 of the photoelectric cell 2 is connected directly to control grid 22 of tube 4. The screen grid 24 of the tube 4 is coupled directly to the plate 12. The cathode 26 of tube 4 is connected to ground through a resistance 28 which is provided with an adjustable tap 30, thus forming a control potentiometer. The tap 30 is connected through line 32 which is shielded to various connections in the control unit. The phototube unit, therefore, provides an amplifier stage which is directly connected across between the regulated power line 6 and ground, the conductivity of which stage is varied by the resistance of the photocell 2 which is connected to the grid. As the conductance through the tube changes, the potential at the tap 30 will vary, and it is this D.C. potential that is used in the control unit for control purposes. This is, therefore, a cathode follower type circuit.

The line 32 extends into the control unit through a similar shielded cable and is connected to one terminal of a variable resistor 34, to one terminal of a condenser 36, and to one terminal of a limiting resistor 38. The main power supply line from the battery or generator of the vehicle is indicated at 40 and is shown as a portion of the cable 42 in the vehicle. The line 40 extends to a fuse 44, the opposite terminal of which is connected through line 46 to a filtering condenser 48 and thence through conductor 50 to one terminal of a ballast tube 52 for regulating the voltage. The line 50, therefore, conveys an unregulated voltage supply. The opposite terminal of ballast tube 52 is connected directly to power line 6 to provide regulated power therein for certain desired uses. Resistors 53 and 55 are connected in series between the power line 6 and ground.

The first two tubes 54 and 56 are incorporated in a multivibrator stage to provide oscillatory pulses for control purposes. The plate 58 of the tube 54 is connected through dropping resistor 60 to the unregulated power supply line 50. In a similar manner plate 62 of tube 56 is connected through limiting resistor 64 to line 50. A condenser 66 is connected between plate 62 of tube 56 and control grid 68 of tube 54. Likewise a condenser 70 is connected between plate 58 of tube 54 and control grid 72 of tube 56. The cathode 74 of tube 54 is connected through line 76 to one terminal of each of a plurality of resistances 78, 80 and 82. A resistor 84 is connected between line 76 and ground line 86. Cathode 79 of tube 56 is directly grounded. The opposite terminal of resistance 82 is connected directly to regulated power line 6 and that of resistor 78 to unregulated line 50. The second terminal of resistor 80 is connected to control grid 72. These resistors form two voltage divider circuits, one consisting of resistors 82 and 84 between the regulated power line 6 and ground and the second consisting of resistors 78 and 84 connected between unregulated line 50 and ground. Since resistor 84 is common to both, cathode bias voltage is supplied to line 76 which is a combination of proportionate regulated and unregulated voltages. Grid bias for control grid 72 is supplied also from line 76. This provides the multivibrator stage which operates in a conventional manner so that the tubes 54 and 56 alternately fire when the proper conditions are attained.

To control the operation of the multivibrator section, one terminal of resistor 38 is connected through line 88 to the control grid 68 of the first tube, and therefore the potential on line 32 determines the bias on grid 68. The output of the multivibrator section is supplied through condenser 92 to the control grid 94 of the power amplifier stage 96. A biasing resistor 95 is connected between control grid 94 and ground. The space charge grid 98 of the tube 96 is connected directly to the regulated power supply 6 and is located nearest the cathode in order to assist the electron flow through the tube. The cathode 100 of the tube 96 is connected directly to the ground line 86. The plate 102 of the power amplifier stage 96 is connected through relay coil 104 of sensitive relay 106 to the power supply line 50. The plate 102 is also connected through a limiting resistor 108 and manually operable override switch 110 to ground.

Stationary contact 112 of relay 106 is connected through conductor 114 to variable resistance 34. The movable armature 116 of the relay oscillates between stationary contact 112 and stationary contact 118 and is itself grounded. Stationary contact 118 is connected through conductor 120 to a stationary contact 122 on the conventional snapover foot switch 124, usually found in automotive vehicles. The other stationary contact 126 of this switch 124 is unconnected. The movable switch arm 128 of the switch 124 is connected through line 130 with one terminal of an operating coil 132 of the power relay 134, the opposite terminal of which is connected to the main power supply line 40 through interconnecting line 136, which also extends to the movable armature 138 of the power relay 134. Armature 138 oscillates between stationary contact 140 and stationary contact 142, the former being connected directly to the low beam filaments indicated as LB and the latter connected to the upper beam filaments indicated as UB. The armature is spring biased into a position in contact with the upper beam contact 142, as shown, and energization of the relay coil 132 will move it down into engagement with contact 140. In like manner relay armature 116 of the sensitive relay 106 is spring biased into engagement with the upper stationary contact 118, and energization of the relay coil 104 will pull the armature 116 down into engagement with the lower stationary contact 112.

In the operation of the system shown in Figure 1, the power amplifier stage 96 is so designed as to normally be conductive in the absence of light on the photocell 2 and the deenergization of the oscillator. Since this stage is conductive, relay coil 104 will be energized and armature 116 will be pulled down into engagement with contact 112. At this time there is no circuit available for energization of the power relay coil 132, the power relay will be deenergized, and armature 138 will remain under spring bias against the stationary contact 142, completing a circuit to the upper beam filaments as follows: power line 40, interconnecting line 136, armature 138, contact 142, to the upper beams. If now light falls upon the photocell 2 and increases in intensity, the potential on grid 22 rises due to a reduction in resistance in the photocell 2 and a resultant reduction in voltage drop across the same, thus increasing in turn the conductance through tube 4 to a predetermined point, then the potential on tap 30 of potentiometer 28—30 will rise, increasing the D.C. potential on control grid 68 of the multivibrator.

At a definite point the multivibrator will start to oscillate through conventional multivibrator action, producing a series of pulses in the output, which pulses are applied through condenser 92 to control grid 94 of the power amplifier stage 96, tending to drive the grid 94 negative and cut off the conductance through this tube. When this negative bias has reached a critical value, relay coil 104 will become deenergized, releasing its armature 116, which snaps back against stationary contact 118, to complete a grounding circuit for the power relay coil 132 as follows: power line 40, relay coil 132, line 130, movable switch arm 128, stationary contact 122, line 120, back contact 118 of relay 106, armature 116, to ground. The energization of this relay coil 132 will attract its armature 138 against the spring bias, pulling it down into engagement with stationary contact 140, opening the circuit to the upper beam filaments and completing a similar circuit to the lower beam filaments, thus automatically dimming the headlamps.

By this action also it will be noted that the opening of the contact between stationary contact 112 and armature 116 breaks the grounding circuit through adjustable resistor 34, and therefore opens a second grounding path from line 32 to ground. This, therefore, changes the sensitivity of the apparatus, making it more sensitive when this circuit is open than when it is closed. Thus, a smaller amount of illumination will be necessary on the photocell to maintain the system in switched condition than was necessary to originally switch it to that condition. The adjustment of resistor 34 determines the amount of light necessary to cause a switching to dim and is referred to as the dim control. Movement of the tap 30 on resistor 28 also provides for the basic sensitivity of the system, which is not changed by any switching arrangement, and can be made more or less sensitive for overall operation as desired. This is called the hold control.

If the incidence of light on the photoelectric cell 2 has caused the system to switch to low beam energization and the operator desires to return to high beam illumination, he merely closes the overriding switch 110, which again completes an obvious circuit through the energizing coil 104 so that it attracts its armature 116, moving it away from stationary contact 118, and breaking the circuit to the power relay coil 132, permitting the power relay to return to high beam position. A resistor 144 connected between line 120 and ground is provided to absorb the surge caused by opening the circuit of the inductive coil 132 and protects the contact 118.

The system as shown in Figure 2 is quite similar to that discussed in Figure 1, like parts being designated by the same reference numeral primed. The phototube unit, as before, is separate and consists of the photocell 2′, the anode of which is directly connected to a regulated power supply line 6′ which extends from the control unit portion of the set. The cathode 20′ of the photocell 2′ is connected directly to the control grid 22′ of the amplifier stage 4′ and the plate 12′ and grid 24′ are commonly connected to the supply line 6′. A resistor 14′ is connected between the supply line 6′ and the filament 16′ of the amplifier. The cathode 26′ is connected through a conductor 146 which is shielded to the main portion of the amplifier and is connected directly to one terminal of a resistor 148, the opposite terminal of which is connected to an interconnecting line 150. The regulated power supply line 6′ is provided as before with power from an unregulated power line 50′ through a ballast tube 52′.

Interconnecting line 150 is connected to one terminal of resistances 152 and 154 and to an intermediate point between a resistance 156 and a condenser 158, the opposite terminal of the latter being grounded. An adjustable tap 160, movable over resistor 152, is grounded to provide the hold control or basic sensitivity adjustment. An adjustable tap 162, movable over the resistor 154, is connected through line 164 to stationary contact 166 of the sensitive relay 106′ and provides the dim control. The multivibrator section in this instance consists as before of two triode tubes 54′ and 56′, which may of course be incorporated in one envelope. The plate 58′ of the tube 54′ is connected through limiting resistor 60′ to the unregulated power supply line 50′. The plate 62′ of tube 56′ in like manner is connected through limiting resistor 64′ to the same line. A condenser 66′ interconnects plate 62′ of the second section with control grid 68′ of the first tube and condenser 70′ in like manner interconnects plate 58′ of the first section with control grid 72′. Cathode 74′ of the first section is connected through conductor 168 to one terminal of a resistor 170 and thence to power supply line 50′.

One terminal of resistor 156 is connected through line 172 to the control grid 68′ of the multivibrator and applies thereto a signal derived from the first amplifier stage in the pickup head. Resistance 174 is connected between line 168 and ground and a biasing resistor 176 is connected between line 168 and control grid 72′. Cathode 79′ is connected to ground. A further resistor 178 is connected between lines 6′ and 168 to provide the same type of combined voltage divider supply from the regulated and unregulated lines as in Figure 1. The output of the multivibrator section is applied through a coupling condenser 92′ to the control grid 94′ of the power amplifier stage 96′. The cathode 100′ is, as before, grounded. A biasing resistor 95′ is connected between the control grid 94′ and ground. The high potential grid 98′ is connected directly to the regulated power supply line 6′.

The plate 102′ of the power amplifier is connected through line 180 to one terminal of the sensitive relay coil 104′, the other terminal being directly connected to the power supply line 50′. The movable armature 116′ of the sensitive relay 106′ is spring biased downwardly, as illustratively shown, into engagement with stationary contact 118′, but is moved upwardly into engagement with stationary contact 166 upon energization of the coil. Stationary contact 118′ is connected through conductor 120′ to the conventional foot switch 124′, as in the previous instance, and thence through conductor 130′ to one terminal of the power relay operating coil 132′, the other terminal of which is connected to the main power source. The power relay 134′ is provided with a movable armature 138′ which oscillates between two stationary contacts 140′ and 142′ which are connected respectively to the upper and lower beam filaments as indicated by UB and LB. Armature 138′ is spring biased downwardly as shown diagrammatically into engagement with stationary contact 140′, and is moved upwardly into engagement with stationary contact 142′ upon energization of the relay coil 132′.

The operation of this control system is substantially the same as that of Figure 1, the multivibrator being nonoperative during periods when no light falls on the photocell, but being thrown into oscillation upon the incidence of a sufficient amount of light and increased potential of the output circuit of the preamplifier tube associated therewith. The more light that falls on said tube, the higher the frequency of the multivibrator output and the more the negative bias applied to the control grid 94′ to drive or keep that tube non-conductive and the control set on low beam. In this instance it will be noted that the potentiometer 154—162 is switched into and out of circuit by the contact 166 of the sensitive relay, thus changing the sensitivity of the control set between bright and dim conditions. The adjustment for the basic sensitivity of the amplifier is accomplished by adjusting potentiometer 152—160, which may be termed the hold sensitivity, whereas the adjustment of potentiometer 154—162 determines the dim sensitivity, or the sensitivity of the set when it switches to dim position as previously mentioned.

We claim:

1. In a light sensitive control system, a source of electrical power, a supply line connected thereto, a second supply line, voltage regulating means connected between the supply lines to provide regulated voltage on the second line, an oscillator connected to said source of electrical power, and biasing means connected to said oscillator and to the two supply lines so that the bias is determined by the combination of the regulated and unregulated voltages.

2. In a light sensitive control system, a source of electrical power, a supply line connected thereto, a second supply line, voltage regulating means connected between the supply lines to provide regulated voltage on the second line, an oscillator connected to said source of electrical power, light sensitive means connected to the oscillator to control the operation thereof, and biasing means for the oscillator connected to said oscillator and to the two supply lines so that the bias is determined by the combination of the regulated and unregulated voltages.

3. In a light sensitive control system, a source of electrical power, a supply line connected thereto, a second supply line, voltage regulating means connected between the supply lines to provide regulated voltage, on the second line, an oscillator connected to said source of electrical power, said oscillator having a grid, cathode and plate, light sensitive means connected to the grid to control operation of the oscillator, a potential divider connected from the first-named supply line to ground, a second potential divider connected from the regulated power supply line to ground, a portion of the two dividers being common, and conductive means interconnecting an intermediate portion of both voltage dividers to the cathode of the oscillator to bias the same.

4. In a light sensitive control system, a source of power, a relay, an electron tube connected to the source of power and to the relay to control operation of the latter, a control grid in the tube, an oscillator having an output, said output being connected to the grid to control conduction through the tube, a photoelectric cell connected to the source of power, an amplifier tube having a grid, plate and cathode, the grid being connected to the cell and the plate to the source of power, two variable resistances connected to said oscillator input, conductive means connecting one of said variable resistors to ground, switching means actuated by the relay in said conductive means, said other variable resistor being connected to the cathode of the amplifier tube, the variable resistors providing adjustments for sensitivity.

5. In a light sensitive control system, a source of electrical power, a first supply line connected thereto, a second supply line, voltage regulating means connected between the supply lines to provide regulated voltage on the second line, a multivibrator including a plurality of electron paths alternately conductive, a cathode, grid and plate in each path, a first potential divider connected between the first supply line and ground, a second potential divider connected between the second supply line and ground, a portion of which is common to the first potential divider, conductive means connecting an intermediate portion of both dividers to one of the cathodes and to one of the grids, said remaining cathode being connected to ground, means for connecting said plates to the first power supply line, and a light sensitive means connected to the other grid to vary the voltage thereon dependent upon incident light, and control the operation of the multivibrator.

References Cited in the file of this patent

UNITED STATES PATENTS

| | | |
|---|---|---|
| 2,228,163 | Cohen | Jan. 7, 1941 |
| 2,302,876 | Malling | Nov. 24, 1942 |
| 2,433,599 | Cohen | Dec. 30, 1947 |
| 2,476,389 | Schmidt | July 19, 1949 |
| 2,590,826 | Schenck | Mar. 25, 1952 |
| 2,632,040 | Rabinow | Mar. 17, 1953 |
| 2,747,139 | Foland et al. | May 22, 1956 |